(12) United States Patent
Shi et al.

(10) Patent No.: US 8,623,180 B2
(45) Date of Patent: Jan. 7, 2014

(54) SEAWATER DESALINIZATION SYSTEM

(75) Inventors: Zheng Shi, Shenzhen (CN); Jiang-Feng Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 289 days.

(21) Appl. No.: 12/981,515

(22) Filed: Dec. 30, 2010

(65) Prior Publication Data

US 2012/0103784 A1     May 3, 2012

(30) Foreign Application Priority Data

Oct. 27, 2010    (CN) .......................... 2010 2 0579075

(51) Int. Cl.
     *B01D 3/00*          (2006.01)
     *C02F 1/14*          (2006.01)

(52) U.S. Cl.
     USPC ........... 202/234; 126/652; 126/698; 126/708; 159/903; 203/10; 203/100; 203/DIG. 1; 203/DIG. 17; 202/190

(58) Field of Classification Search
     USPC ............. 126/652, 698, 708; 159/903, DIG. 1, 159/DIG. 15; 202/190, 234, 242, 267.1; 203/10, 86, 100, DIG. 1, DIG. 17
See application file for complete search history.

(56) References Cited

U.S. PATENT DOCUMENTS

| | | | |
|---|---|---|---|
| 3,870,605 A * | 3/1975 | Sakamoto | 202/234 |
| 4,010,080 A * | 3/1977 | Tsay et al. | 202/83 |
| 4,687,550 A * | 8/1987 | Wong | 202/165 |
| 6,274,004 B1* | 8/2001 | Andersen | 202/234 |
| 6,280,577 B1* | 8/2001 | Wang | 202/185.3 |
| 6,439,298 B1* | 8/2002 | Li | 165/104.33 |
| 6,582,563 B1* | 6/2003 | Adam et al. | 203/11 |
| 6,830,661 B1* | 12/2004 | Land | 202/83 |
| 7,927,463 B2* | 4/2011 | Fang | 202/163 |
| 2006/0180460 A1* | 8/2006 | Nagler | 202/234 |
| 2010/0330639 A1* | 12/2010 | Lee | 435/161 |
| 2011/0120854 A1* | 5/2011 | Lee | 203/86 |

* cited by examiner

*Primary Examiner* — Virginia Manoharan
(74) *Attorney, Agent, or Firm* — Altis Law Group, Inc.

(57) ABSTRACT

A seawater desalinization system includes a container portion, a heat conduction cover, and a heating device. The container portion defines a receiving chamber and a slot. The heat conduction cover covers on the container portion and seals the receiving chamber and the slot. The container portion is heated by the heating device. The heating device can absorb solar energy to heat the seawater under the dark condition. Therefore, the seawater desalinization system can heat the seawater to obtain fresh water continually.

6 Claims, 7 Drawing Sheets

SEAWATER DESALINIZATION SYSTEM

CROSS-REFERENCE TO RELATED APPLICATIONS

This application is one of the three related co-pending U.S. patent applications listed below. All listed applications have the same assignee and were concurrently filed herewith. The disclosure of each of the listed applications is incorporated by reference into all the other listed applications.

| Ser. No. | Title | Inventors |
| --- | --- | --- |
| 12/981,524 | SEAWATER DESALINIZATION DEVICE | Shi et al. |
| 12/981,513 | SEAWATER DESALINIZATION DEVICE | Shi et al. |
| 12/981,515 | SEAWATER DESALINIZATION SYSTEM | Shi et al. |

BACKGROUND

1. Technical Field

The present disclosure generally relates to seawater desalinization systems.

2. Description of Related Art

It is well known that fresh water is the essential resources for human beings. However, with continuously worsen of environmental; the useable fresh water is facing pollution and becoming exhausted in the large-scale. About 70% of the earth is covered by seawater. People design seawater desalinization devices to desalinate seawater to obtain the fresh water. However, the seawater desalinization devices usually have complex structures and higher cost. Furthermore, the seawater desalinization devices usually adopt chemical method to desalinate seawater to obtain the fresh water. Therefore, the fresh water may be affected healthy. In addition, this kind of the seawater desalinization devices can not work during cloudy or night.

Therefore, there is room for improvement within the art.

BRIEF DESCRIPTION OF THE DRAWINGS

Many aspects of the seawater desalinization system can be better understood with reference to the following drawings. The components in the drawings are not necessarily to scale, the emphasis instead being placed upon clearly illustrating the seawater desalinization system. Moreover, in the drawings, like reference numerals designate corresponding parts throughout the several views.

DETAILED DESCRIPTION

Figure 1:
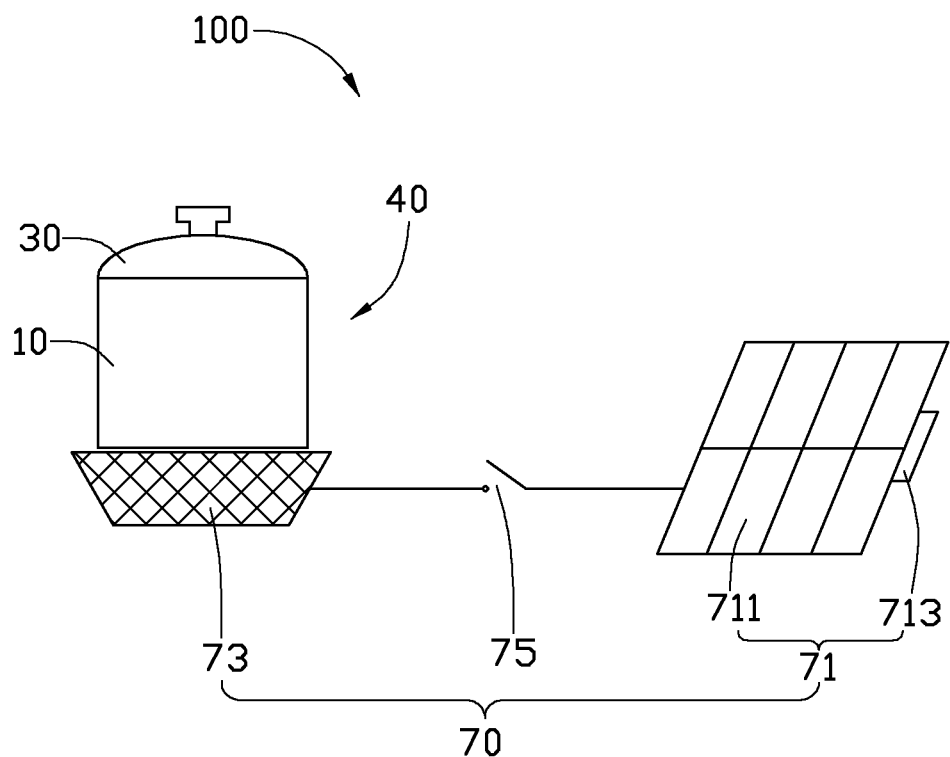
FIG. 1 is an isometric view of a seawater desalinization system, according to an exemplary embodiment.

FIG. 1 shows an exemplary embodiment seawater desalinization system 100 including a seawater desalinization device 40 and a heating device 70.

Figure 2:
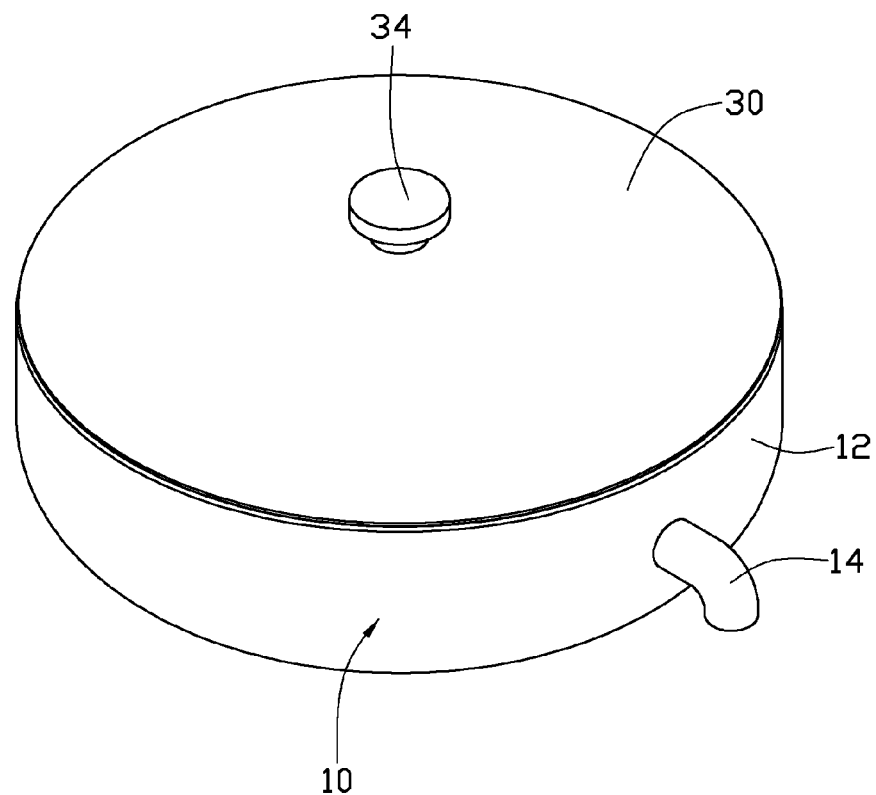
FIG. 2 is an assembled view of a seawater desalinization device including a container portion and a heat conduction cover shown in FIG. 1.
Figure 3:
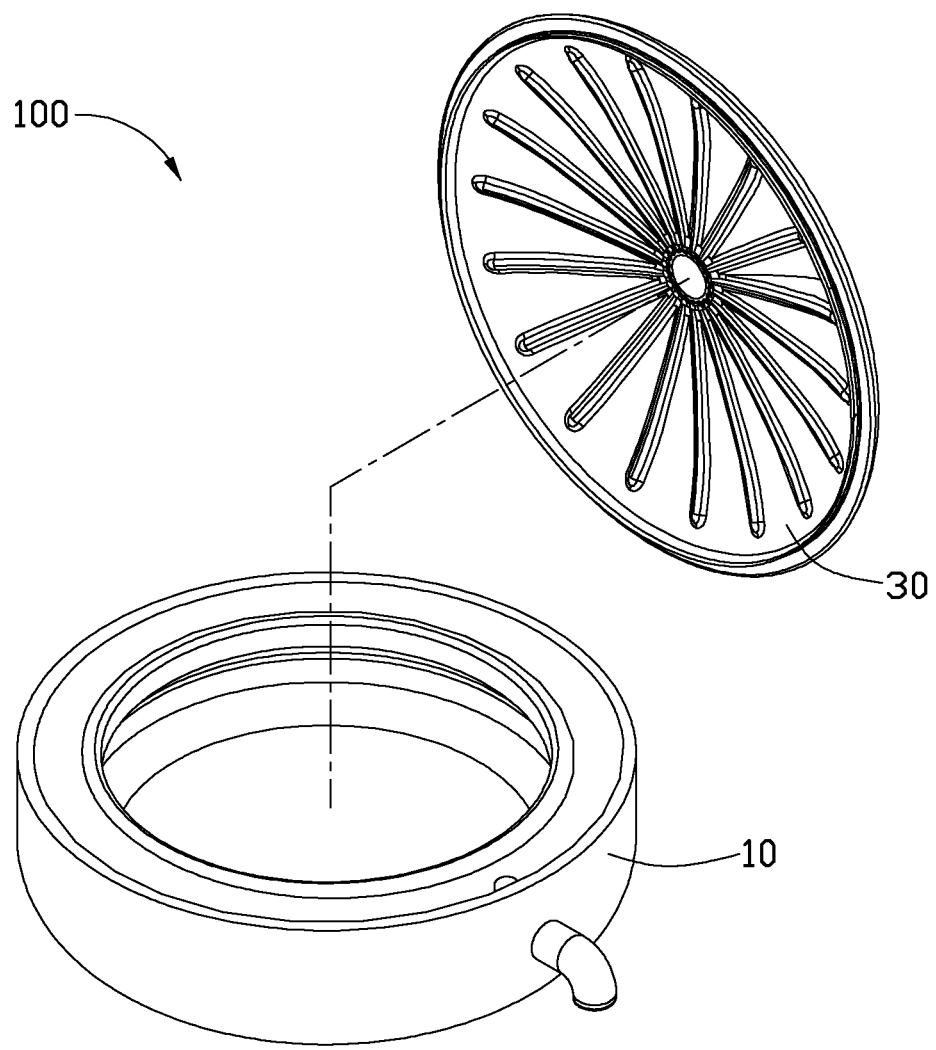
FIG. 3 is an exploded view of the container portion and the heat conduction cover shown in FIG. 2.

Referring to FIGS. 2 and 3, the seawater desalinization device 40 includes a container portion 10, a heat conduction cover 30 covering on the container portion 10. The container portion 10 may be made of stainless steel for containing seawater. The container portion 10 includes a main body 12 and a guiding pipe 14 fixed on the main body 12.

Figure 4:
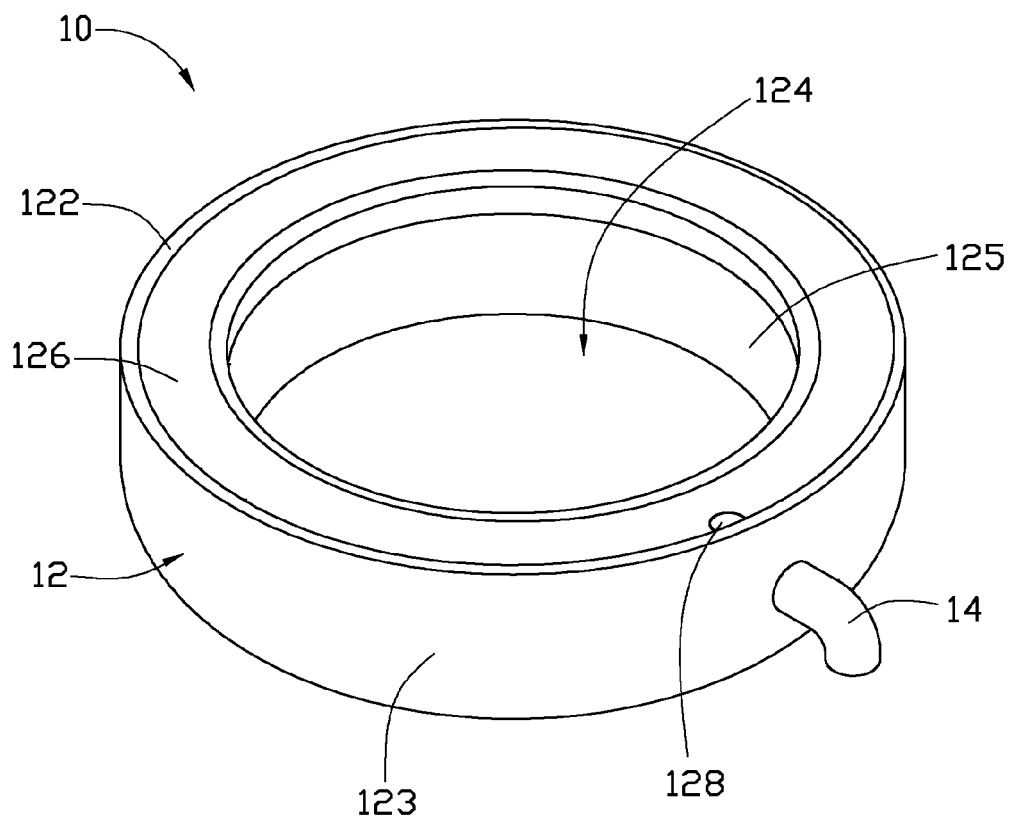
FIG. 4 is an isometric view of the container portion shown in FIG. 1.
Figure 5:
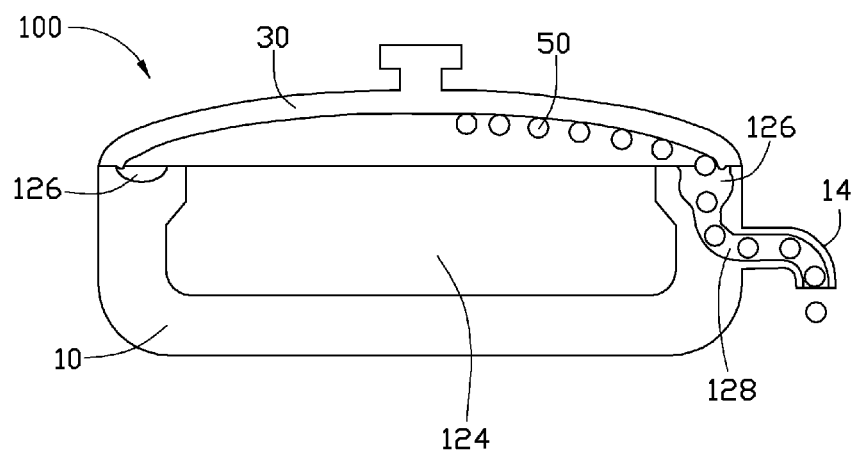
FIG. 5 is a schematic view of the container portion and the heat conduction cover of the seawater desalinization device shown in FIG. 2.

Referring to FIG. 4 and FIG. 5, the main body 12 includes a top portion 122 and a peripheral wall 123. The top portion 122 defines a receiving chamber 124, a ring slot 126, and a hole 128. The receiving chamber 124 is for receiving seawater. In the exemplary embodiment, an inner wall of the receiving chamber 124 is coated by a heat absorption layer 125 for absorbing solar energy to heat the seawater. The slot 126 is defined around the receiving chamber 124 for storing water. The cross-sectional view of the slot 126 is substantially semi-circular for reducing resistance to the fresh water 50 flowing into the hole 128. The hole 128 is defined in a bottom of the slot 126 for connecting the slot 126 to the guiding pipe 14. A bottom wall of the slot 126 can be an inclined plane and the hole 128 defined at the lowest portion of the slot 126. Therefore, the fresh water 50 can automatically flow into the hole 128.

The guiding pipe 14 is fixed on the peripheral wall 123 and communicates with the hole 128. Therefore, the fresh water 50 can flow out of the guiding pipe 14 through the hole 128.

Figure 6:
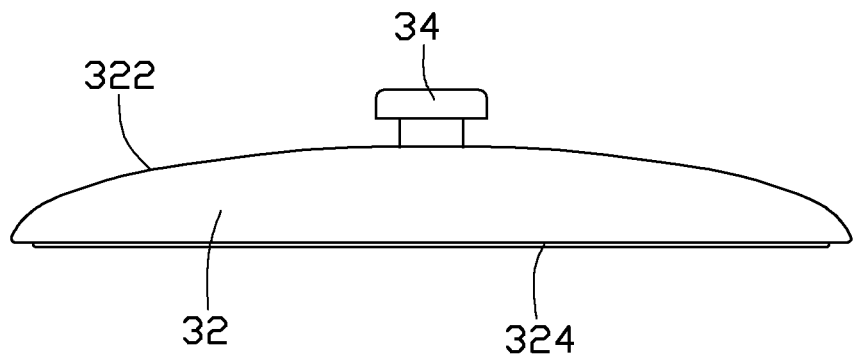
FIG. 6 is an isometric view of the heat conduction cover shown in FIG. 1.
Figure 7:
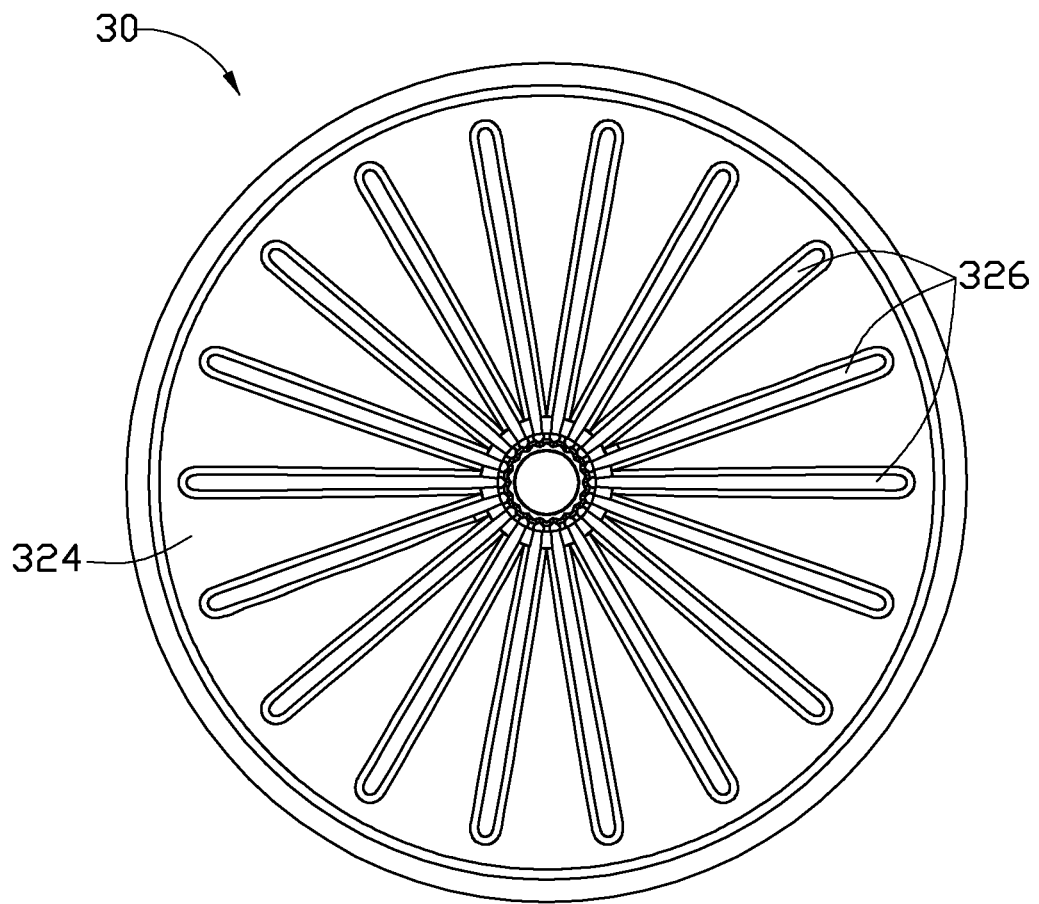
FIG. 7 is an isometric view of the heat conduction cover shown in FIG. 5, but in another angle.

Referring to FIG. 6 and FIG. 7, the heat conduction cover 30 includes a cover 32 and a handle 34 positioned on the cover 32. The cover 32 may be made of transparent toughened glass. In the exemplary embodiment, the cover 32 is a convex lens for focusing solar energy. The cover 32 includes a first surface 322 and an opposite second surface 324. The handle 34 is fixed on a center of the first surface 322. A plurality of guiding slots 326 are defined in the second surface 324. The guiding slots 326 take a position of the handle 34 as a radiation center and are defined in the second surface 324. The guiding slots 326 are configured guiding the fresh water 50 flow into the slot 126.

Referring to FIG. 1, the heating device 70 includes a photoelectric transducer 71, an electric heater 73, and an optical switch 75 electronically connecting the photoelectric transducer 71 to the electric heater 73. The photoelectric transducer 71 includes a plurality of solar-cell panels 711 and a battery 713 electronically connecting to the solar-cell panels 711. The optical switch 75 can automatically switch on to connect the photoelectric transducer 71 to the electric heater 73 under the dark condition. The electric energy stored in the battery 713 is transferred to the electric heater 73. The electric heater 73 converts the electric energy into the thermal energy to heat the container portion 10. The optical switch 75 can automatically switch off to disconnect the photoelectric transducer 71 to the electric heater 73 under the sunlight. The solar-cell panels 711 absorb the solar energy and convert the solar energy into the electric energy. The electric energy is finally stored in the battery 713. Meanwhile, the sunlight shines in the seawater which stored in the container portion 10.

When the seawater desalinization system 100 is to be used, the seawater desalinization device 40 is placed in the open air. The container portion 10 filled with the seawater is placed on the electric heater 73. Then the heat conduction cover 30 is taken on the main body 12. The optical switch 75 automatically switches off to disconnect the photoelectric transducer 71 to the electric heater 73 under the sunlight. The solar-cell panels 711 absorb the solar energy and convert the solar energy into the electric energy. The electric energy is finally stored in the battery 713. Meanwhile, the sunlight shines in the seawater stored in the container portion 10 through the heat conduction cover 30. The heat absorption layer 125 absorbs the solar energy to increase the temperature of the seawater. Therefore, the fresh water 50 can be evaporated from the seawater. The fresh water 50 is gathered on the second surface 324 and flows along the guiding slots 326, and then the fresh water 50 drops into the slot 126. Because the hole 128 is defined at lowest portion of the slot 126, the fresh water 50 automatically flows into the hole 128 and flows out of the guiding pipe 14.

The optical switch 75 automatically switches on to connect the photoelectric transducer 71 to the electric heater 73 under the dark condition. The electric energy stored in the battery 713 is transferred to the electric heater 73. The electric heater 73 converts the electric energy into the thermal energy to heat the container portion 10. Therefore, the fresh water 50 can be evaporated from the seawater and the fresh water 50 flows out of the guiding pipe 14.

The seawater desalinization device 40 has a simple structure and it is convenient to use. In addition, the fresh water 50 is obtained by physical vapor method, thereby the fresh water 50 is safe to drink. Furthermore, the seawater desalinization device 40 includes the heating device 70 can absorb solar energy to heat the seawater under the dark condition. Therefore, the seawater desalinization system 100 can heat the seawater to obtain the fresh water 50 continually.

In another embodiment, the guiding slots 326 can be omitted, the fresh water 50 evaporated from the seawater can attach to the second surface 324 and drop into the slot 126.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A seawater desalinization system, comprising:
   a desalinization device including:
   a container portion defining a receiving chamber for storing seawater and a slot defined around the receiving chamber, a heat absorption layer coated on an inner wall of the receiving chamber;
   a heat conduction cover covering on the container portion and covering the receiving chamber and the slot, the heat conduction cover comprising a cover which is a convex lens for focusing solar energy; and
   a heating device automatically heating the container portion and absorbing solar energy under a sunlight condition;
   wherein the container portion comprises a guiding pipe fixed on a peripheral wall thereof; the slot defines a hole communicating the slot with the guiding pipe; a bottom wall of the slot is an inclined plane and the hole is defined at the lowest portion of the slot; the cross-sectional view of the slot is semi-circular; the heat absorption layer absorbs the solar energy to increase the temperature of the seawater, and fresh water is evaporated from the seawater and gathered on the heat conduction cover to drop into the slot.

2. The seawater desalinization system as claimed in claim 1, wherein the heat conduction cover defines a plurality of guiding slots facing the container portion, the plurality of guiding slots guide the fresh water to flow into the slot.

3. The seawater desalinization system as claimed in claim 2, wherein the plurality of guiding slots take a center of the heat conduction cover as a radiation center and are defined in the heat conduction cover.

4. The seawater desalinization system as claimed in claim 2, wherein the heat conduction cover is made of transparent toughened glass.

5. The seawater desalinization system as claimed in claim 1, wherein the heating device comprises a photoelectric transducer, an electric heater, and an optical switch electronically connecting the photoelectric transducer to the electric heater; the optical switch automatically switches on to connect the photoelectric transducer to the electric heater and automatically switches off to disconnect the photoelectric transducer to the electric heater under the sunlight.

6. The seawater desalinization system as claimed in claim 5, wherein the photoelectric transducer comprises at least one solar-cell panel and a battery electronically connected to the at least one solar-cell panel, the at least one solar-cell panel absorbs solar energy and converts the solar energy into electric energy, and the electric energy is stored in the battery; the electric heater converts the electric energy into the thermal energy to heat the container portion when the optical switch automatically switches on.

* * * * *